Jan. 14, 1936.  T. N. SOLOMON  2,027,888
ADJUSTABLE HINGE STRUCTURE FOR AUTOMOBILE BODIES
Filed Feb. 23, 1934
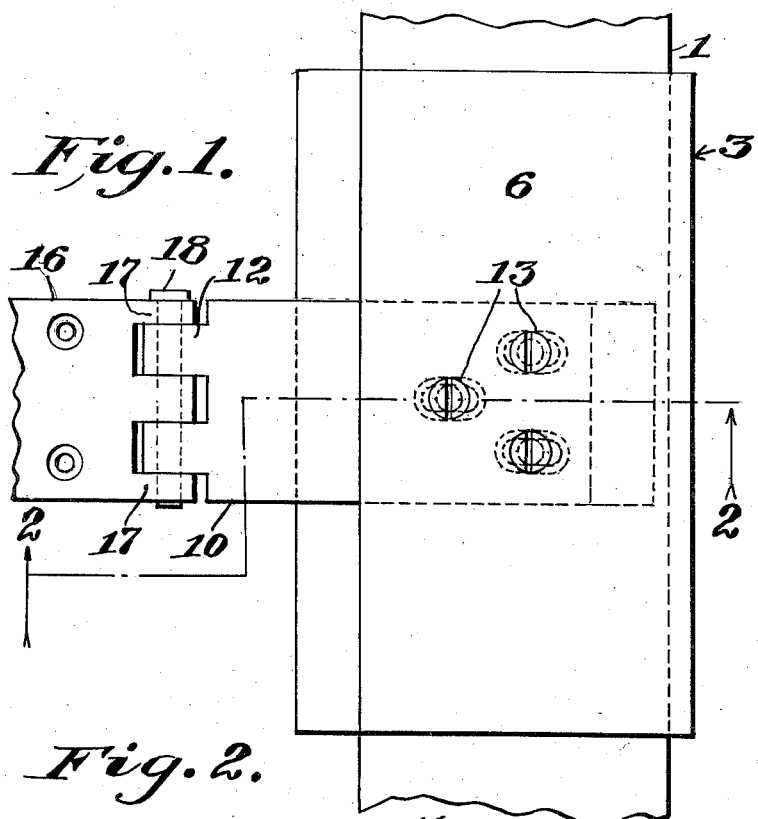
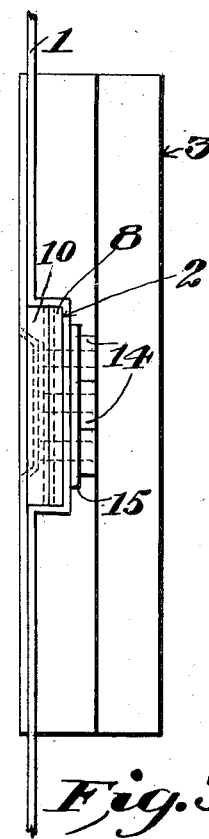
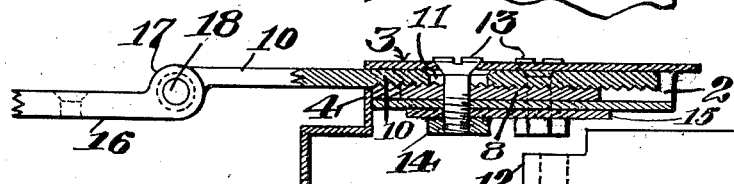
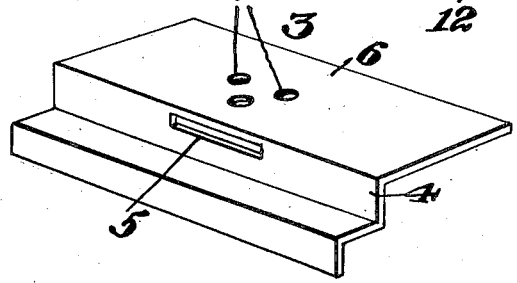
Inventor
Thomas N. Solomon
By E. E. Vrooman & Co.
His Attorneys Patented Jan. 14, 1936

2,027,888

UNITED STATES PATENT OFFICE 2,027,888

ADJUSTABLE HINGE STRUCTURE FOR AUTOMOBILE BODIES

Thomas N. Solomon, Detroit, Mich., assignor of one-fourth to Charles E. Pellow and one-fourth to Charles S. Pellow, Detroit, Mich.

Application February 23, 1934, Serial No. 712,638

3 Claims. (Cl. 16—130)

This invention relates to an adjustable hinge structure, particularly adapted for steel automobile bodies.

An object of the invention is the construction of a simple and efficient adjustable hinge structure for facilitating in keeping the door of an automobile in a nicely adjusted position.

It is to be understood that in building steel automobile bodies, there is likelihood, when assembling, of a variation in some of its parts, which results in causing the fitting of the door to be somewhat difficult; hence to overcome this objection, I have invented a new and novel hinge structure, which is simple in construction, yet durable and efficient in operation.

A further object of my invention is the construction of a hinged device which may be used to advantage in automobile bodies other than metal or steel bodies.

With the foregoing and other objects in view, my invention comprises certain novel constructions, combinations and arrangements of parts as will be hereinafter fully described, illustrated in the accompanying drawing, and more particularly pointed out in the appended claims.

In the drawing:

Figure 1 is a view in front elevation of a structure constructed in accordance with the present invention.

Figure 2 is a view partly in elevation and partly in section, taken on line 2—2, Figure 1, and looking in the direction of the arrows.

Figure 3 is a view in rear elevation.

Figure 4 is a perspective view of the panel.

Figure 5 is a bottom plan view of the adjustable plate.

Figure 6 is a top plan view of the stationary plate.

Referring to the drawing by numerals, I designates a steel pillar of an automobile body. In suitable places on the pillar I is formed a pocket 2, Fig. 3. A panel 3 is placed over the pillar I. This panel is provided with a face portion 4 in which is formed an elongated slot 5. This slot or aperture 5 registers with pocket 2. In the top portion 6 of panel 3 is formed a plurality of apertures 7.

Within pocket 2 is a stationary plate 8. This plate is provided with apertures 9 corresponding in number to apertures 7. The upper face of the plate 8 is serrated or toothed. One edge of the plate bears against the face portion 4 of the panel 3, Fig. 2, making a very durable structure. An elongated adjustable plate 10 extends through elongated slot 5 and is provided with serrations or teeth on its under face, which mesh with the serrations on stationary plate 8. Plate 10 is provided with a series of elongated, longitudinally extending apertures 11 that correspond in number and register with apertures 7 and 9. The plate 10 is adjustable within the pocket 2, whereas the flat plate 8 is stationary therein. Plate 10 is provided on its outer end with a pair of apertured ears 12. Screws 13 extend through apertures 7, elongated apertures 11, apertures 9, and through the pocket portion of the pillar I (Figs. 2 and 3) and on their inner ends are threaded nuts 14. Interposed between nuts 14 and the pocket portion of the pillar I is a bearing plate 15, which strengthens the structure, giving the same more rigidity.

A hinged door-engaging plate 16 is provided with a plurality of apertured ears 17, registering with ears 12 of the adjustable plate. In these ears 12 and 17, I place a bolt or pintle 18 for securing these parts together.

Upon slightly unscrewing the screws 13, the stationary plate 8 and the adjustable plate 10 can be separated sufficiently to allow the adjustable plate to be slid in or out, so to speak, to obtain the desired adjustment to a nicety, then upon tightening the screws, the parts will be efficiently retained in their adjusted position.

The pillar I and the panel 3 constitute a support of a special type for receiving and supporting my novel kind of a hinge structure. Therefore, in the claims, when I specify a "support", it is with a view to supporting the novel type of a hinge means as herein described and illustrated in the accompanying drawing.

While I have described the preferred embodiment of my invention and illustrated the same in the accompanying drawing, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a structure of the class described, the combination of a pillar provided with a pocket, a panel over said pocket, a stationary plate within said pocket, an adjustable plate extending through said panel and into said pocket and in engagement with said stationary plate, a door-engaging plate hingedly mounted on said adjustable plate, and means extending through said panel, adjustable plate and stationary plate for holding the same together.

2. In a structure of the class described, the combination of a vertical steel pillar provided with a pocket, an angle panel over a portion of said pillar and closing one end of said pocket, said panel being provided with a face portion and with an elongated slot in said face portion registering with said pocket, a stationary plate in said pocket and having one edge bearing against said face portion of the panel, said stationary plate being provided with serrations over its entire upper face, an adjustable, elongated plate extending through said elongated slot and into said pocket, said adjustable plate being provided with serrations over part of its under face, said adjustable plate and stationary plate having their serrated faces in engagement, door-engaging means on the outer end of said adjustable plate, a bearing plate against the outer face of the pocket portion of said pillar, screws extending through said panel, adjustable plate, stationary plate, pillar and bearing plate, and nuts threaded on said screws against said bearing plate, substantially as shown and described.

3. In a structure of the class described, the combination of a support, a stationary serrated plate within said support, an adjustable plate provided with a serrated portion extending through said support with its serrated portion therein, means detachably holding the serrated portions of said stationary and adjustable plates together, and an engaging unit hingedly mounted on the outer end of said adjustable plate.

THOMAS N. SOLOMON.